(12) United States Patent  
Ishikawa et al.

(10) Patent No.: US 8,648,971 B2
(45) Date of Patent: Feb. 11, 2014

(54) MULTIPLE VIEW LIQUID CRYSTAL DISPLAY

(75) Inventors: Yoshimitsu Ishikawa, Tokyo (JP);
Takeshi Kubota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 43 days.

(21) Appl. No.: 13/549,834

(22) Filed: Jul. 16, 2012

(65) Prior Publication Data

US 2013/0070188 A1  Mar. 21, 2013

(30) Foreign Application Priority Data

Sep. 16, 2011  (JP) ................. 2011-203023

(51) Int. Cl.
*G02F 1/1335* (2006.01)
(52) U.S. Cl.
USPC ........................................................ 349/15
(58) Field of Classification Search
USPC ........................................................ 349/15
See application file for complete search history.

(56) References Cited

U.S. PATENT DOCUMENTS

| 7,583,334 | B2 | 9/2009 | Maeda |
| 7,907,223 | B2 | 3/2011 | Maeda |
| 7,982,728 | B2 | 7/2011 | Hamagishi |
| 7,985,466 | B2 | 7/2011 | Saitoh et al. |
| 8,144,079 | B2 | 3/2012 | Mather et al. |
| 2007/0218261 | A1 | 9/2007 | Saitoh et al. |
| 2008/0117365 | A1 | 5/2008 | Maeda |
| 2009/0096811 | A1 | 4/2009 | Tanaka et al. |

FOREIGN PATENT DOCUMENTS

| JP | 2007-249052 A | 9/2007 |
| JP | 2007-264082 | 10/2007 |
| JP | 2008-64917 | 3/2008 |
| JP | 2008-129375 A | 6/2008 |
| JP | 2011-76095 | 4/2011 |
| WO | WO 2007/001071 A1 | 1/2007 |

*Primary Examiner* — Phu Vu
(74) *Attorney, Agent, or Firm* — Oblon, Spivak, McClelland, Maier & Neustadt, L.L.P.

(57) ABSTRACT

In a multiple view liquid crystal display, occurrence of a reverse view phenomenon and a reverse view crosstalk are suppressed. A black matrix is formed on the opposed surface of a counter substrate to a TFT substrate in a liquid crystal panel, and a parallax barrier is provided on the black matrix with a gap layer having a predetermined thickness interposed therebetween. The black matrix includes a first light blocking part disposed immediately below an opening in the parallax barrier, and a second light blocking part with a portion immediate thereabove covered by the parallax barrier. The second light blocking part includes a low refractive-index film (reverse view preventive film), having a lower refractive index than that of a liquid crystal, at the end thereof which is in contact with a pixel opening between the second light blocking part and the adjacent first light blocking part.

12 Claims, 12 Drawing Sheets

F I G. 1
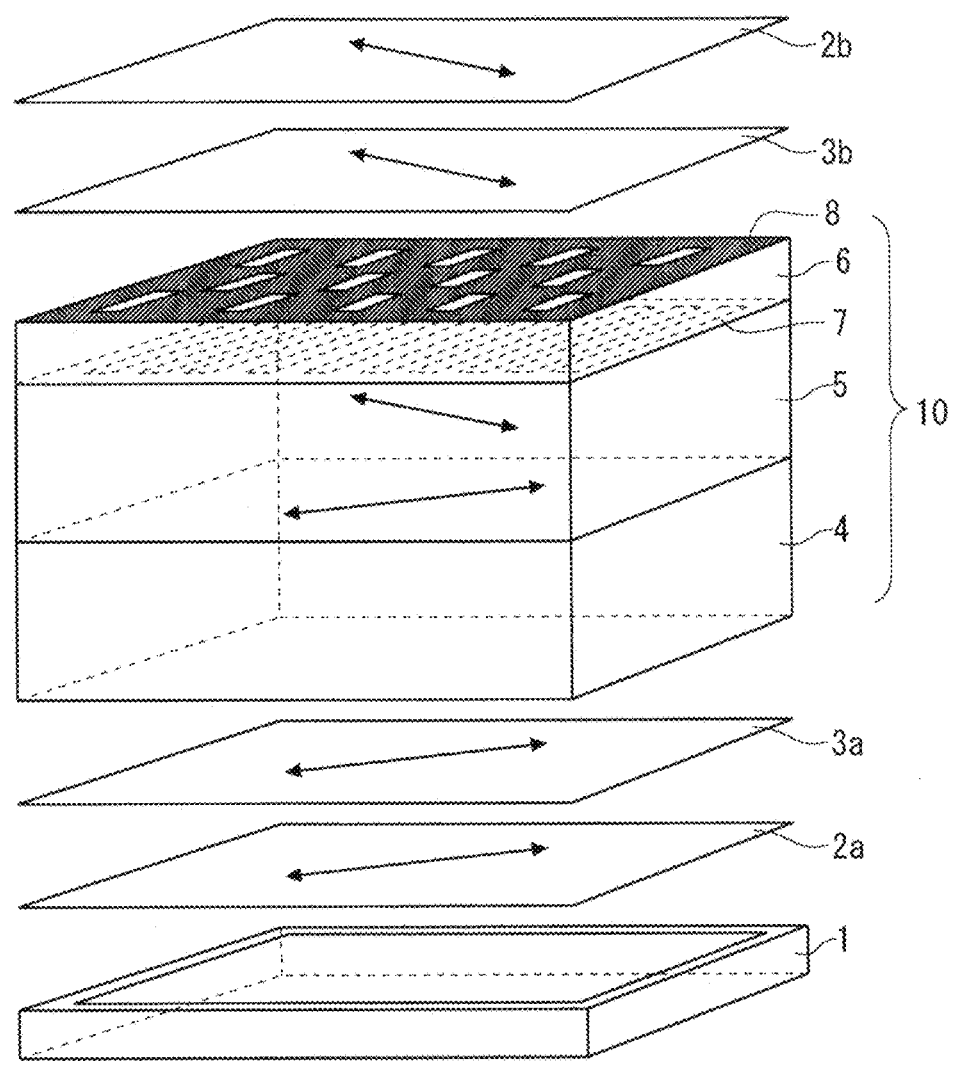

F I G. 4
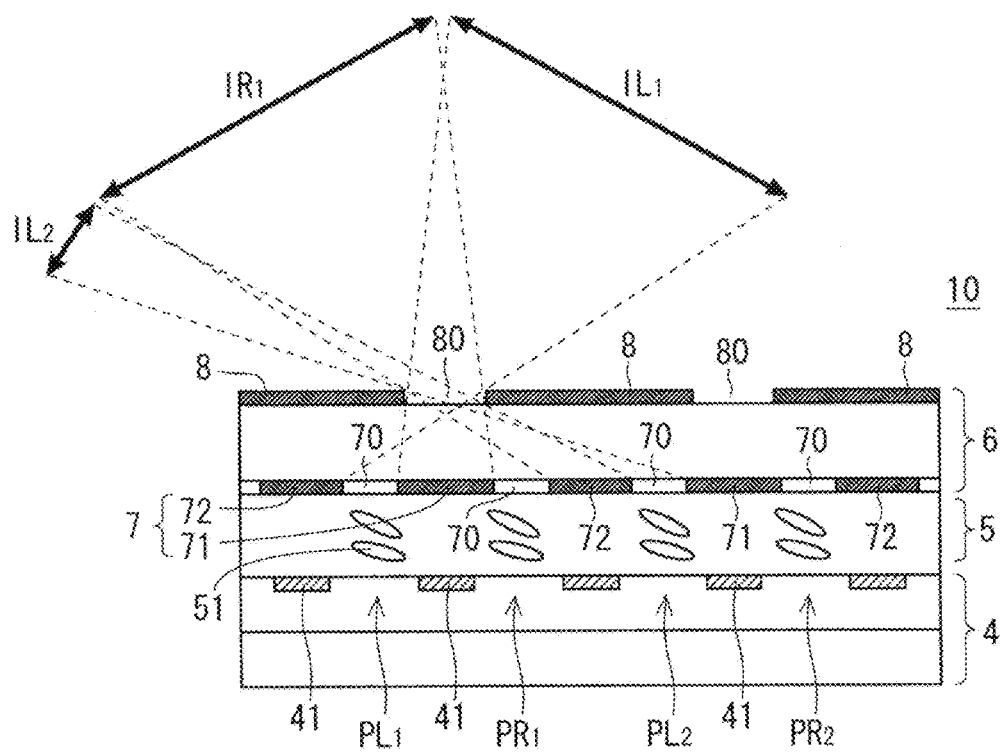
F I G. 5
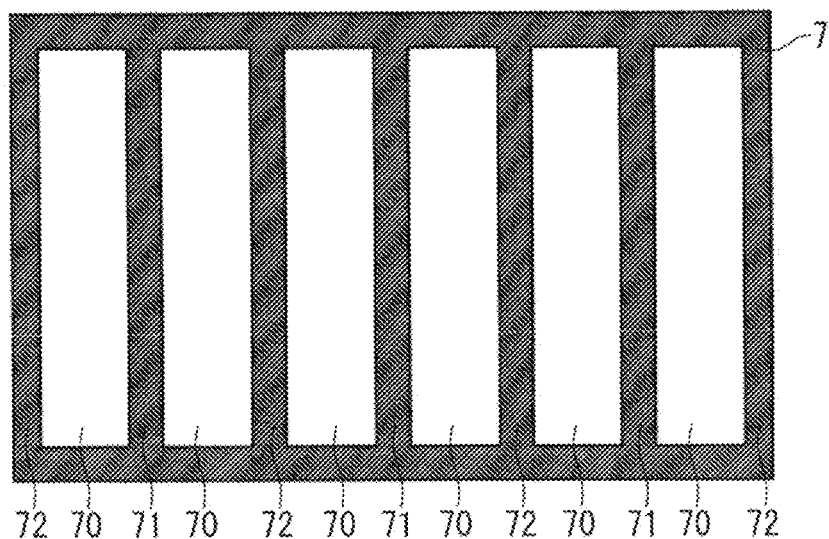

F I G. 1 7
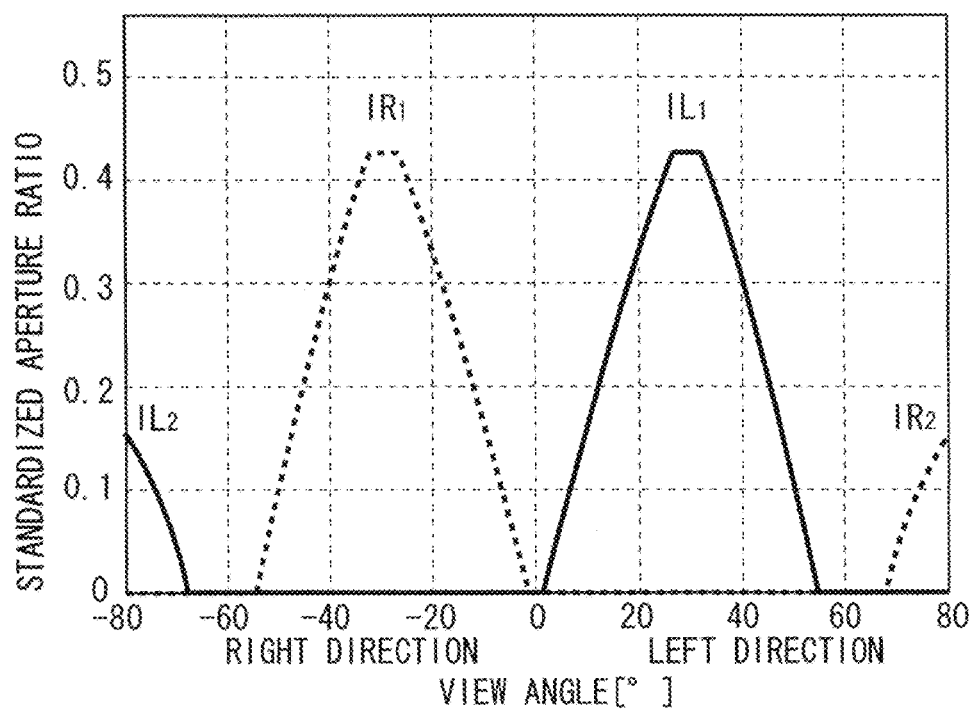

F I G. 2 0
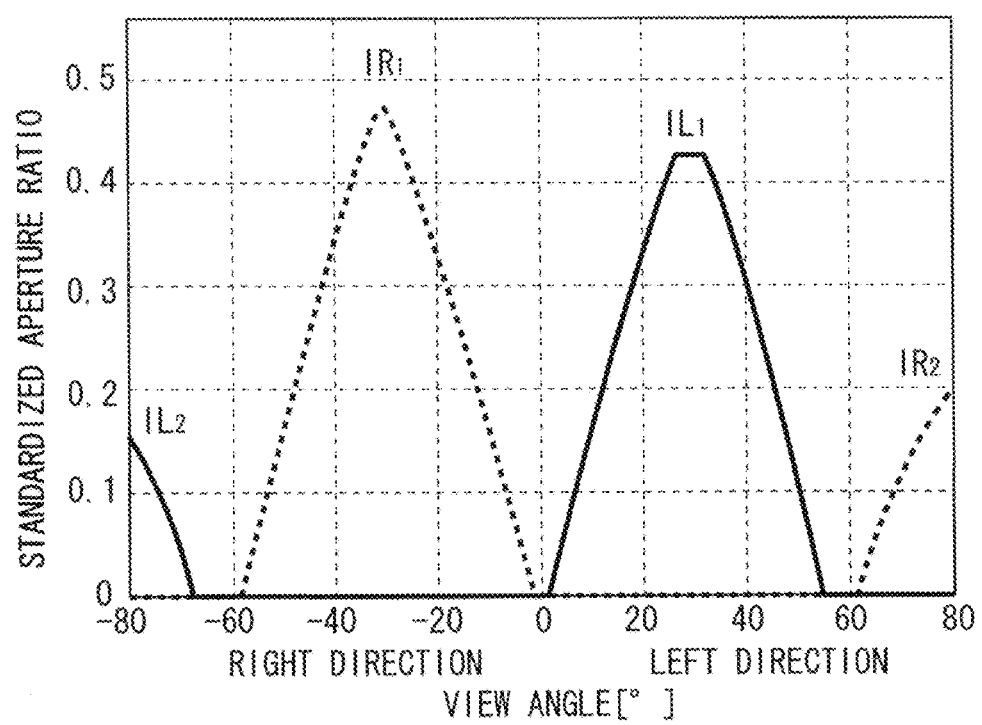

MULTIPLE VIEW LIQUID CRYSTAL DISPLAY

BACKGROUND OF THE INVENTION

1. Field of the Invention

The present invention relates to a liquid crystal display, and particularly relates to a multiple view liquid crystal display capable of displaying a plurality of images in respectively different directions.

2. Description of the Background Art

Taking advantage of merits of consuming low power and being compact and lightweight, a liquid crystal display has been applied to any display such as monitors of a personal computer (PC), mobile information terminal equipment and the like, and a television receiver. The liquid crystal display is a device which is provided with a plurality of pixels arranged in matrix form and performs optical modulation on each pixel, to display an image. As a representative example of the liquid crystal display, there is widely known an active matrix-type display using a thin film transistor (TFT) as a switching element to supply an image signal to each pixel.

In recent years, there has been developed a multiple view liquid crystal display (multiple screen liquid crystal display) capable of displaying a plurality of images with view angles in respectively different directions by means of one liquid crystal display panel (liquid crystal panel). For example, Japanese Patent Application Laid-Open No. 2007-264082, Japanese Patent Application Laid-Open No. 2008-064917 and PCT International Publication No. WO2007/001071 each disclose a parallax barrier-system multiple view liquid crystal display, especially a dual view liquid crystal display (two-screen liquid crystal display) where an image displayed when viewed from the right side to the front of a screen and an image displayed when viewed from the left side thereto are different.

The parallax barrier-system multiple view liquid crystal display has a structure including a liquid crystal panel where pixels to display a plurality of images are mixed and arrayed in accordance with a predetermined rule, and a light blocking layer called a parallax barrier disposed on the front side (viewed side) of the panel. The parallax barrier is arranged so as to block light travelling in a specific direction from each pixel of the liquid crystal panel. Thereby, light from the liquid crystal panel is separated into a plurality of directions, and a plurality of images displayed on the display panel are displayed in respectively different directions.

The parallax barrier-system multiple view liquid crystal display has a problem of a "crosstalk", by which part of an image that should be displayed in the other direction is leaked and observed in an image displayed in one direction.

For example, when the crosstalk occurs in a parallax barrier-system dual view liquid crystal display that displays two images separately on the right and left, an image (image for left) that should be displayed when the screen is viewed from the left to the front and an image (image for right) that should be displayed when viewed from the right to the front are viewed as overlapping each other. This crosstalk occurs when view angle ranges (visual field ranges) of the respective images overlap, and tends to occur in the vicinity of a boundary of the visual field ranges of the respective images. That is, in the dual view liquid crystal display, the crosstalk tends to occur when the screen is viewed from the front as the boundary between the visual field range of the image for right and the visual field range of the image for left. Especially when an image with a large amount of black is displayed, even a slight leak from the other image tends to be viewed, thus having a large affect on image quality.

The crosstalk is considered to be mainly caused by, other than the design problem of the multiple view liquid crystal display, a light diffraction phenomenon at the opening in the parallax barrier, a light scattering phenomenon inside the liquid crystal panel, and the like.

Generally, the liquid crystal panel has a structure including a first substrate disposed with a pixel electrode, and a switching element, a signal line and the like which supply a pixel signal to the electrode. The structure includes a second substrate disposed with a black matrix and a color filter (CF) which define an area of each pixel. The structure includes a liquid crystal sandwiched between the first and second substrates. In the parallax barrier-system dual view liquid crystal display, the black matrix to define pixel areas is formed on the front surface of the second substrate which is opposed to the first substrate, and the parallax barrier is formed on the opposite surface thereto (on the viewed side). Hence there exists a gap having a predetermined thickness between the parallax barrier and the black matrix. For example, when the parallax barrier is arranged on the black matrix with a translucent substrate such as a glass substrate constituting the second substrate interposed therebetween, a thickness of this translucent substrate corresponds to the gap. A size of this gap serves as an element to decide a direction and a width of a visual field range of each of a plurality of simultaneously displayed images, along with a size of an opening in the parallax barrier, a pitch of pixels, and the like.

In the parallax barrier-system multiple view liquid crystal display, there occurs a phenomenon called a "reverse view", by which an image that should be displayed in the reverse direction is viewed when the screen is viewed from the direction greatly off the front, due to the existence of the gap between the parallax barrier and the black matrix. For example, when an observer moves from the front of the screen to the right with respect to the dual view liquid crystal display, there is a range from which the image for right is first viewed and the image for left is then viewed as the observer keeps moving to the right. This is attributable to that another pixel, which is a pixel next to a pixel that should essentially be viewed, is undesirably viewed through the opening in the parallax barrier (a detail will be described later).

That is, in the parallax barrier-system dual view liquid crystal display, the visual field range of the image for left due to the reverse view phenomenon exists outside the visual field range of the image for right, and the visual field range of the image for right due to the reverse view phenomenon exists outside the visual field range of the image for left. For this reason, the crosstalk between the image for right and the image for left occurs not only in the vicinity of the front of the screen, but in practice tends to occur in the vicinity of the outer end of the visual field range of each of the image for right and the image for left. Hereinafter, the crosstalk that occurs in the vicinity of the front of the screen is referred to as a "front crosstalk", and the crosstalk that occurs in the vicinity of the outer end of each visual field range of each image is referred to as a "reverse view crosstalk".

The front crosstalk and the reverse view crosstalk are problematical not only in the dual view liquid crystal display, but also in an arbitrary multiple view liquid crystal display having a parallax barrier system.

Each of foregoing Japanese Patent Application Laid-Open No. 2007-264082, Japanese Patent Application Laid-Open No. 2008-064917 and PCT International Publication No. WO2007/001071 mainly discloses a method for preventing the front crosstalk in the dual view liquid crystal display, but does not sufficiently discloses a measure against the reverse view crosstalk. For example, Japanese Patent Application Laid-Open No. 2007-264082 does not refer to the problem of the reverse view crosstalk at all. Japanese Patent Application Laid-Open No. 2008-064917 refers to occurrence of the reverse view crosstalk, but does not particularly take an effective measure thereagainst. PCT International Publication No. WO2007/001071 shows that in a vehicle-mounted dual view liquid crystal display, a range where the reverse view phenomenon occurs is a range which can hardly be viewed from a driver seat and a passenger seat (outside from the front by not less than 45°), but does not refer to a method for substantially preventing the reverse view crosstalk.

On the condition that an angle at which the reverse view phenomenon occurs is set extremely outside by application of the technique of PCT International Publication No. WO2007/001071, the reverse view crosstalk may be prevented, but for implementation thereof, it is necessary to make the gap between the parallax barrier and the black matrix smaller and make the pixel pitch larger. However, since the pixel pitch recently tends to decrease with improvement in definition of the display, it is in practice necessary to make the gap between the parallax barrier and the black matrix extremely small. For example when the gap is formed by the translucent substrate constituting the second substrate, the translucent substrate needs to be made extremely thin, but this is difficult to implement since there is a physical limit for this.

SUMMARY OF THE INVENTION

It is an object of the present invention to provide a multiple view liquid crystal display capable of suppressing occurrence of a reverse view phenomenon and a reverse view crosstalk while ensuring a size of a gap between a parallax barrier and a black matrix.

A multiple view liquid crystal display according to a first aspect of the present invention includes: a first substrate disposed with a plurality of pixel electrodes to be supplied with image signals corresponding to a plurality of images; a second substrate arranged as opposed to the first substrate; and a liquid crystal sandwiched between the first substrate and the second substrate. The second substrate is provided with a black matrix as a light blocking film disposed on the opposed surface to the first substrate and having an opening that defines an area of each pixel, a gap layer which has a predetermined thickness and is arranged on the black matrix, and a parallax barrier as a light blocking film which is disposed on the black matrix with the gap layer interposed therebetween and separates light having passed through the openings in the black matrix into different directions, so as to separate the plurality of images and display the images in the respective different directions. The black matrix is provided with a first light blocking part disposed immediately below the opening in the parallax barrier, and a second light blocking part with a portion immediate thereabove covered by the parallax barrier. The second light blocking part has at the end thereof a reverse-view preventive film with a lower refractive index than that of the liquid crystal, the end being in contact with the opening between the second light blocking part and the adjacent first light blocking part.

A multiple view liquid crystal display according to a second aspect of the present invention includes: a first substrate disposed with a plurality of pixel electrodes to be supplied with image signals corresponding to a plurality of images; a second substrate arranged as opposed to the first substrate; and a liquid crystal sandwiched between the first substrate and the second substrate. The second substrate is provided with a black matrix as a light blocking film disposed on the opposed surface to the first substrate and having an opening that defines an area of each pixel, a gap layer which has a predetermined thickness and is arranged on the black matrix, and a parallax barrier as a light blocking film which is disposed on the black matrix with the gap layer interposed therebetween and separates light having passed through the openings in the black matrix into different directions, so as to separate the plurality of images and display the images in the respective different directions. The black matrix is provided with a first light blocking part disposed immediately below the opening in the parallax barrier, and a second light blocking part with a portion immediate thereabove covered by the parallax barrier. The second light blocking part has at the end thereof a reverse-view preventive film having a lower light transmittance than that of the opening, the end being in contact with the opening between the second light blocking part and the adjacent first light blocking part.

A multiple view liquid crystal display according to a third aspect of the present invention includes: a first substrate disposed with a plurality of pixel electrodes to be supplied with image signals corresponding to a plurality of images; a second substrate arranged as opposed to the first substrate; and a liquid crystal sandwiched between the first substrate and the second substrate. The second substrate is provided with a black matrix as a light blocking film disposed on the opposed surface to the first substrate and having an opening that defines an area of each pixel, a gap layer which has a predetermined thickness and is arranged on the black matrix, and a parallax barrier as a light blocking film which is disposed on the black matrix with the gap layer interposed therebetween and separates light having passed through the openings in the black matrix into different directions, so as to separate the plurality of images and display the images in the respective different directions. The black matrix is provided with a first light blocking part disposed immediately below the opening in the parallax barrier, and a second light blocking part with a portion immediate thereabove covered by the parallax barrier. The second light blocking part has a larger width than that of the adjacent first light blocking part.

According to the present invention, it is possible to suppress the reverse view phenomenon and the reverse view crosstalk while ensuring a certain size of the gap between the parallax barrier and the black matrix. It is therefore possible to improve viewability of a display screen in the parallax barrier-system multiple view liquid crystal display.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an exploded perspective view showing a schematic configuration of a multiple view liquid crystal display according to a first preferred embodiment;

FIG. 4 is a sectional view showing a configuration of a display panel of a conventional multiple view liquid crystal display;

FIG. 5 is a view showing a configuration of a black matrix of the conventional multiple view liquid crystal display;

FIG. 17 is a graph showing view angle characteristics of a standardized aperture ratio in the multiple view liquid crystal display according to the third preferred embodiment;

FIG. 20 is a graph showing view angle characteristics of a standardized aperture ratio in the multiple view liquid crystal display according to the modified example of the third preferred embodiment.

DESCRIPTION OF THE PREFERRED EMBODIMENTS

First Preferred Embodiment

Figure 2:
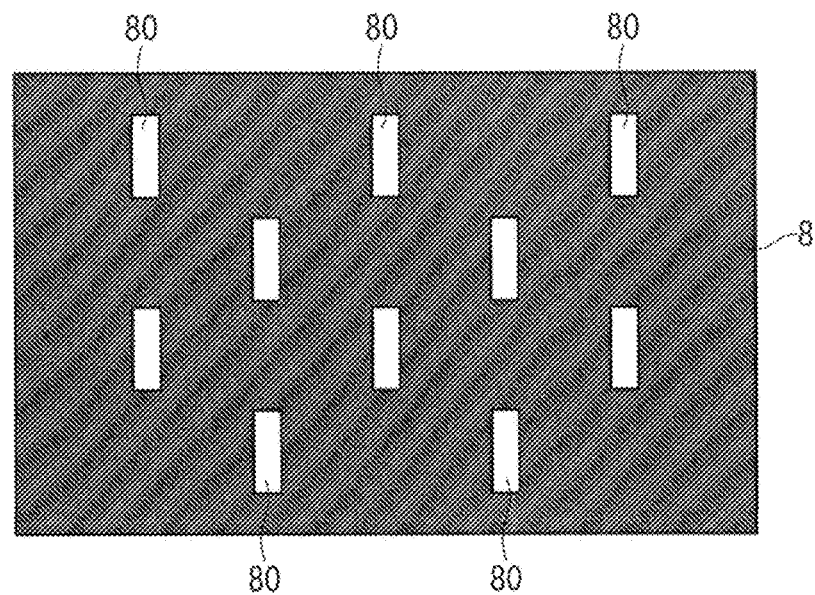
FIG. 2 is a view showing a pattern example of a parallax barrier.

FIG. 1 is an exploded perspective view showing a schematic configuration of a multiple view liquid crystal display according to the first preferred embodiment. As in the figure, the multiple view liquid crystal display is a transmissive display formed by superimposing a linear polarizer 2a, a view-angle compensation film 3a, a liquid crystal panel 10, a view-angle compensation film 3b and a linear polarizer 2b on this order on a back light 1 as a planar optical apparatus including an optical source, a light guide plate, and the like. The liquid crystal panel 10 has a structure where a liquid crystal 5 is sandwiched between a TFT substrate 4 on the back light 1 side and a counter substrate 6 on the front side (viewed side).

The counter substrate 6 is provided with a translucent substrate such as a glass substrate as a base material, and a black matrix 7 is disposed on the opposed surface of this translucent substrate to the TFT substrate 4, while a parallax barrier 8 is disposed on the surface on the viewed side. That is, in the present embodiment, the translucent substrate of the counter substrate 6 is disposed between the parallax barrier 8 and the black matrix 7, and functions as a gap layer to define a space between the parallax barrier 8 and the black matrix 7.

Although an example will be shown in each preferred embodiment below where the translucent substrate as the base material of the counter substrate 6 serves as the gap layer, the gap layer may be provided separately from the translucent substrate. For example, inside the translucent substrate as the base material of the counter substrate 6 (e.g. on the opposed surface of the translucent substrate to the TFT substrate 4), the parallax barrier layer, the black matrix and the gap layer therebetween may be disposed. For example, separately from the translucent substrate as the base material of the counter substrate 6, a glass substrate having a predetermined thickness, a resin layer having been applied and formed to have a predetermined thickness, and the like may be provided as the gap layer. The counter substrate 6 may at least include the black matrix on the surface opposed to the TFT substrate 4, the gap layer having a predetermined thickness and arranged on this black matrix, and the parallax barrier disposed on the black matrix with this gap layer interposed therebetween.

In addition, the term "base material" used here means a principal constitutional member to decide strength, stiffness and the like of the whole of the counter substrate 6 when the material is used as the base material of the counter substrate 6, and is used in a similar meaning in the present specification.

In addition, respective arrows shown in FIG. 1 indicate alignment directions of the liquid crystal 5, absorption axes of the linear polarizers 2a and 2b and alignment directions of the view-angle compensation films 3a and 3b.

In the present preferred embodiment, the liquid crystal panel 10 is one on a TN (Twisted Nematic) mode where the liquid crystal 5 is aligned as twisted by substantially 90° with an electric field in a non-applied state. However, an application of the present invention is not restricted to this, but the present invention is also applicable to the liquid crystal panel 10 on any liquid crystal mode, such as a lateral electric field driving system including an IPS (In-Plane Switching) mode and an FFS (Fringe Field Switching) mode, and a VA (Vertical Alignment) mode where the liquid crystal is substantially vertically aligned with an electric field in a non-applied state.

In the liquid crystal panel 10, the TFT substrate 4 and the counter substrate 6 are stuck with a seal material interposed therebetween, the seal material being applied on the peripheries thereof, and the liquid crystal 5 is sealed within an area surrounded by the seal material.

The TFT substrate 4 is formed by disposing, on a translucent substrate such as a glass substrate, a pixel electrode of each pixel, a TFT (Thin Film Transistor) as a switching element for providing an image signal to each pixel electrode, a gate wire (scanning signal wire) for supplying a drive signal to a gate electrode of the TFT, a source wire (display signal wire) for supplying an image signal to a source electrode of the TFT, and the like and is further provided with an alignment film on the top surface thereof on the liquid crystal 5 side.

The counter substrate 6 is formed by disposing, on the surface of the translucent substrate such as the glass substrate to the liquid crystal 5 side, a counter electrode (common electrode), a color filter formed of colored layers of respective colors of red (R), green (G) and blue (B), the black matrix 7 as the light blocking film to define an area of each pixel by blocking light between the pixels, and the like. In the parallax barrier-system multiple view liquid crystal display, the parallax barrier 8 is further provided on the surface of the counter substrate 6 on the viewed side. Accordingly, in the present preferred embodiment, the gap between the black matrix 7 and the parallax barrier 8 corresponds to the thickness of the translucent substrate such as the glass substrate constituting the counter substrate 6.

The linear polarizers 2a and 2b are films to selectively transmit specific linear polarized light (p-polarized light or s-polarized light). Further, the view-angle compensation films 3a and 3b are WV (Wide Viewing) films, such as λ/4 plates (λ is a wavelength of light), to compensate light so as to widen view angles.

In the present preferred embodiment, as each of the linear polarizers 2a and 2b, an absorption-type linear polarizer is employed which uses a cellulose triacetate (TAC) film as a substrate and absorbs linear polarized light on a polarization axis (absorption axis) intersected with linear polarized light to be transmitted. As each of the linear polarizers 2a and 2b, a reflection-type linear polarizer may be employed which reflects linear polarized light on the polarization axis intersected with linear polarized light to be transmitted.

On a normal TN mode, a twist angle of the liquid crystal 5 is set to 90°, and the polarization axis directions of the pair of the linear polarizers 2a and 2b are designed to be substantially parallel or substantially vertical to the alignment directions of the liquid crystal modules on the end surfaces of the liquid crystal 5 on the respectively closer sides to the polarizers.

It is assumed here that the multiple view liquid crystal display according to the present preferred embodiment is a dual view liquid crystal display that displays two different images separately on the right side and the left side to the front.

Further, in the present preferred embodiment, the liquid crystal 5 is aligned as twisted by substantially 90° with an electric field in a non-applied state, and a value Δnd as a product of a refractive index anisotropy Δn with a wavelength of 550 nm and a liquid crystal layer thickness d is not smaller than 300 nm and not larger than 400 nm. Further, the polarization axis direction of each of the linear polarizers 2a and 2b is substantially parallel to the alignment directions of the liquid crystal modules on the end surfaces of the liquid crystal 5 on the respectively closer sides to the polarizers, and an angle formed by the polarization axes of the linear polarizers 2a and 2b is designed to be not smaller than 85° and smaller than 90°.

On this design condition, it is possible to obtain a multiple view liquid crystal display where a contrast (CR) in a visual field in the vicinity of the front is relatively low and a contrast in each of desired slant visual fields (e.g. ranges of the order of 20° to 60° from the front to the right and left) is relatively high.

In the liquid crystal panel 10 of the dual view liquid crystal display, pixels (pixels for right) constituting an image (image for right) displayed toward a visual field range on the right side to the front of the screen and pixels (pixels for left) constituting an image (image for left) displayed toward a visual field range on the left side to the front of the screen are mixed and disposed in accordance with a predetermined rule. The parallax barrier 8 separates light of the pixels for right and light of the pixels for left respectively to the right side and the left side to the front, thereby to separate the image for right and the image for left and display them in respectively different directions.

The parallax barrier 8 is a light blocking film to block the light of the pixels for left with respect to the right side to the front of the screen, and block the light of the pixels for right with respect to the left side to the front of the screen. In other words, the parallax barrier 8 is a light blocking film having openings to pass only the light of the pixels for right to the right side to the front of the screen, and pass only the light of the pixels for left to the left side to the front of the screen.

Figure 3:
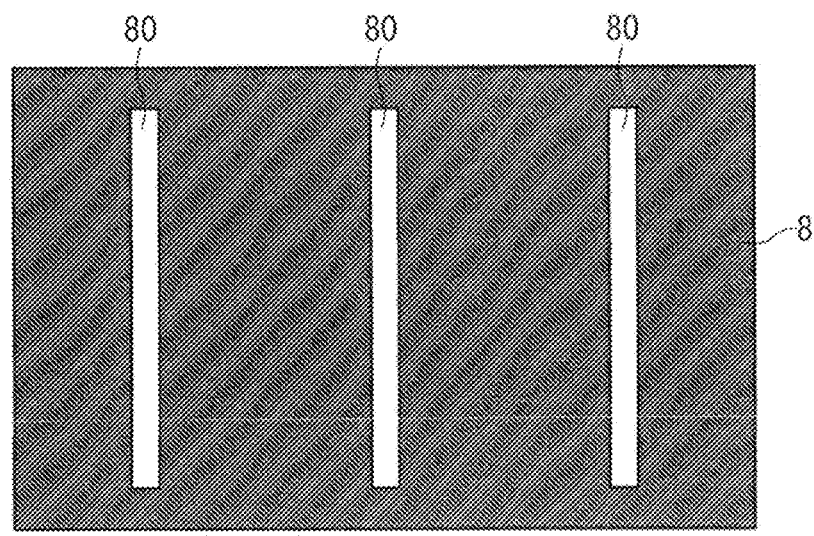
FIG. 3 is a view showing a pattern example of the parallax barrier.

The pattern of the parallax barrier 8 varies in accordance with an array pattern of the pixels for right and the pixels for left in the liquid crystal panel 10. The parallax barrier 8 may have an arbitrary pattern so long as being designed to allow proper display of a right-side image on the right side to the front of the screen and a left-side image on the left side to the front of the screen. For example, openings 80 may be arranged in checked form (staggered form) in the parallax barrier 8 as in FIG. 2, or the openings 80 may be arranged in striped form as in FIG. 3 in the parallax barrier 8.

Herein, as a comparative example, a configuration of a conventional parallax barrier-system multiple view liquid crystal display (dual view liquid crystal display) will be described. FIG. 4 is a sectional view showing a configuration of the liquid crystal panel 10 thereof.

As described above, the liquid crystal panel 10 has the structure formed by sandwiching the liquid crystal 5 between the TFT substrate 4 on the back side thereof (back light 1 side) and the counter substrate 6 on the front side thereof (viewed side) (liquid crystal modules 51 in the liquid crystal 5 are schematically shown in FIG. 4). Although the TFT substrate 4 is disposed with the pixel electrode of each pixel, the TFT, the gate wire, the source wire and the like, only a source wire 41 is shown in FIG. 4 out of those.

The black matrix 7 is formed on the opposed surface of the counter substrate 6 to the TFT substrate 4, and the parallax barrier 8 is formed on the viewed side of the black matrix 7 with the translucent substrate such as the glass substrate having a predetermined thickness interposed therebetween. In practice, the opposed surface of the counter substrate 6 to the TFT substrate 4 is formed with a counter electrode (common electrode), a color filter and the like other than the black matrix 7, but illustrations of those are omitted.

The black matrix 7 is a light blocking film provided with an opening (pixel opening) 70 that defines an area of each pixel. Herein, pixels PL for left and pixels PR for right are alternately arranged with respect to each pixel row. That is, in a plane view, a pixel row of the pixels PR for right and a pixel row of the pixels PL for left are alternately arranged in striped form.

The pixel opening 70 is disposed in a position displaced from the opening 80 in the parallax barrier 8. That is, a light blocking part 71 of the black matrix 7 is disposed immediately below the opening 80 in the parallax barrier 8. The pixel PR for right and the pixel PL for left to be viewed from the same opening 80 in the parallax barrier 8 are disposed so as to sandwich the light blocking part 71. Further, also in an area covered by the light blocking part of the parallax barrier 8, a light blocking part 72 of the black matrix 7 is disposed between the mutually adjacent pixel PR for right and pixel PL for left. Hereinafter, the light blocking part 71 disposed immediately below the opening 80 in the parallax barrier 8 is referred to as a "first light blocking part", and the second light blocking part 72 with a portion immediate thereabove covered by the parallax barrier 8 is referred to as a "second light blocking part".

In this comparative example, since the pixel row of the pixels PR for right and the pixel row of the pixels PL for left are alternately arranged in striped form, a pattern is formed as in FIG. 5 where the black matrix 7 is disposed with a plurality of pixel openings 70 in striped form, and the light blocking part of the black matrix 7 is formed in the pattern where the first light blocking parts 71 and second light blocking parts 72 are alternately arranged while sandwiching the pixel opening 70.

With a positional relation between the opening 80 in the parallax barrier 8 and the pixel opening 70 in the black matrix 7 forming the above relation, the image for right produced by the pixels PR for right is displayed toward the right side to the front of the screen and the image for left produced by the pixels PL for left is displayed toward the left side to the front of the screen. With reference to FIG. 4, for example, the image for right produced by the pixels PR for right can be viewed from a visual field range $IR_1$, and the image for left produced by the pixels PL for left can be viewed from a visual field range $IL_1$.

In a position where the visual field range $IR_1$ of the image for right and the visual field range $IL_1$ of the image for left overlap, a crosstalk occurs. For this reason, in the liquid crystal panel 10, the gap between the black matrix 7 and the parallax barrier 8 (corresponding to the thickness of the translucent substrate constituting the counter substrate 6) and a position and a diameter of each of the pixel openings 70 and the openings 80 in the parallax barrier 8 are designed so as to keep overlapping of those images to a minimum. This gap between the black matrix 7 and the parallax barrier 8 is set to a predetermined distance in accordance with a condition for a view angle and a pixel size which are required of the display, and for example, when the pixel size is 200 µm and the condition for each of view angle ranges from the front to the right and left is up to 60 degrees, the maximal value of an allowable gap is on the order of 0.09 mm, and an allowable range of the thickness of the translucent substrate constituting the counter substrate 6 which corresponds to this gap is also on the order of 0.09 mm at the maximum. Therefore, the thickness of the translucent substrate of the counter substrate 6 is set to a predetermined thickness that satisfies the above allowable range of the thickness.

Figure 6:
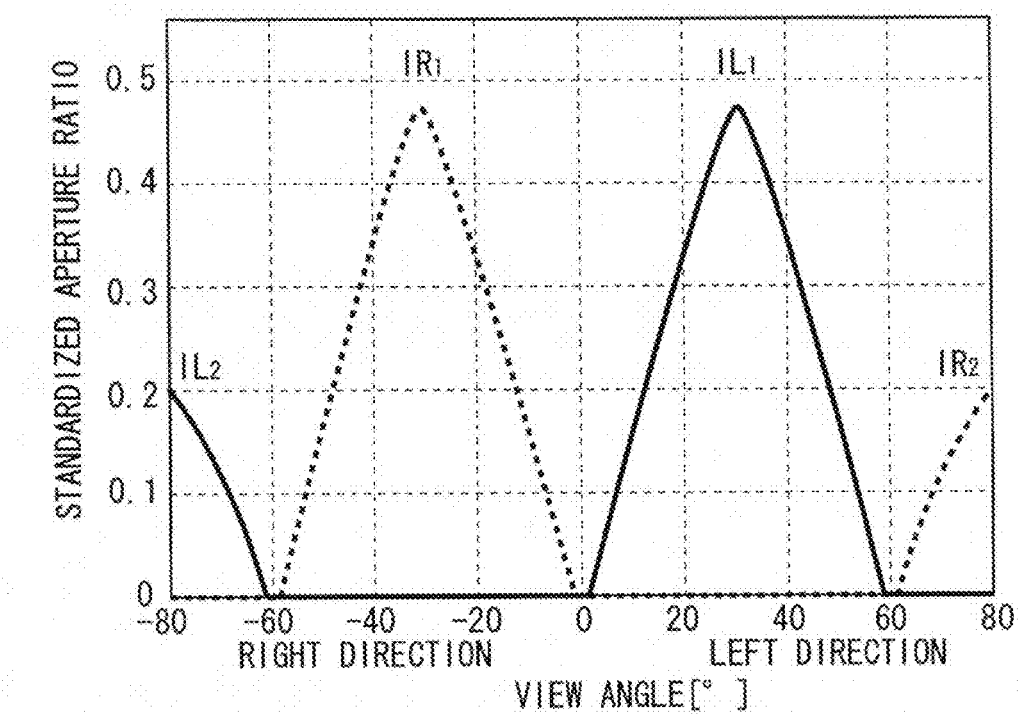
FIG. 6 is a graph showing view angle characteristics of a standardized aperture ratio in the conventional multiple view liquid crystal display.

FIG. 6 is a graph showing a simulation result of view angle characteristics of a standardized aperture ratio in a multiple view liquid crystal display designed according to the above condition. The standardized aperture ratio is an aperture ratio obtained regarding a case, where the entire width of the pixel can be used as a transmitted part, as "1". A dotted graph indicates a standardized aperture ratio of the image for right and a solid graph indicates a standardized aperture ratio of the image for left.

The standardized aperture ratio of the image for right reaches the peak in the vicinity of a position of 30 degrees from the front to the right, and the standardized aperture ratio of the image for left reaches the peak in the vicinity of a position of 30 degrees from the front to the left. Further, the vicinity of the front (0°) is an area where the standardized aperture ratios of both the image for right and the image for left are 0, namely, neither the image for right nor the image for left is viewed. This means that the visual field range $IR_1$ of the image for right and the visual field range $IL_1$ of the image for left are separated, and the front crosstalk does not occur.

On the other hand, although the standardized aperture ratio of the image for right is 0 in the vicinity of a position of 60 degrees from the front to the right, there is an area on the outside thereof where the standardized aperture ratio of the image for left increases. Similarly, although the standardized aperture ratio of the image for left is 0 in the vicinity of a position of 60 degrees from the front to the left, there is an area on the outside thereof where the standardized aperture ratio of the image for right increases. These respectively indicate occurrence of reverse view phenomena.

A mechanism of occurrence of the reverse view phenomenon will be described with reference to FIG. 4. When attention is focused on the opening 80 on the left side of the parallax barrier 8 shown in FIG. 4, this opening 80 is essentially one to cause light of a pixel $PR_1$ for right which is adjacent to the first light blocking part 71 immediately below the opening 80 to pass therethrough toward the visual field range $IR_1$ of the image for right and also cause light of a pixel $PL_1$ for left to pass therethrough toward the visual field range $IL_1$ of the image for left.

However, due to the existence of the gap between the black matrix 7 and the parallax barrier 8, an area $IL_2$ appears outside the visual field range $IR_1$ of the image for right. In the area $IL_2$, a pixel $PL_2$ for left, which is adjacent to the image $PR_1$ for right with the second light blocking part 72 interposed therebetween and should not essentially be viewed from the opening 80, is undesirably viewed. This is a reverse view phenomenon. Similarly, an area where a pixel for right, which should not essentially be viewed, is undesirably viewed also exists outside the visual field range $IR_1$ of the image for right, though its illustration is omitted.

In the simulation result of FIG. 6, the vicinities of 60 degrees on the right and left are areas where the standardized aperture ratios of both the image for right and the image for left are 0, namely, neither the image for right nor the image for left is viewed. This means that the crosstalk (reverse view crosstalk) due to the reverse view phenomenon does not occur.

However, in practice, the reverse view crosstalk may occur caused by a light diffraction phenomenon at the opening in the parallax barrier 8, a light scattering phenomenon inside the liquid crystal panel 10, or the like. Hereinafter, there will be described a multiple view liquid crystal display according to the present invention which can solve this problem.

Figure 7:
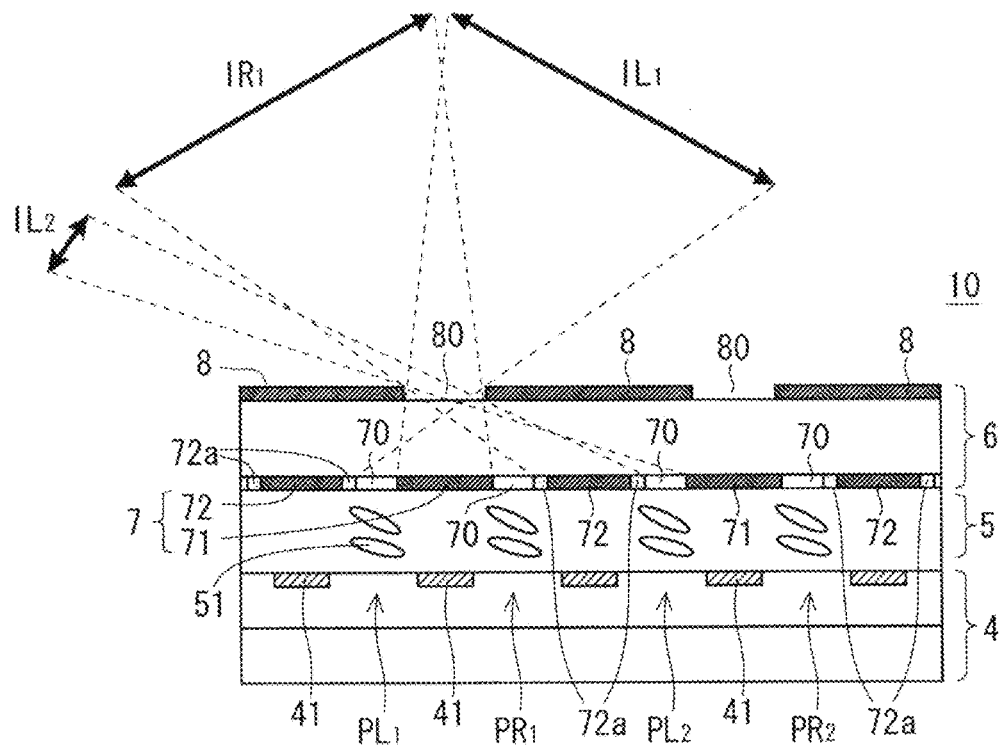
FIG. 7 is a sectional view showing a configuration of a display panel of a multiple view liquid crystal display according to the first preferred embodiment.
Figure 8:
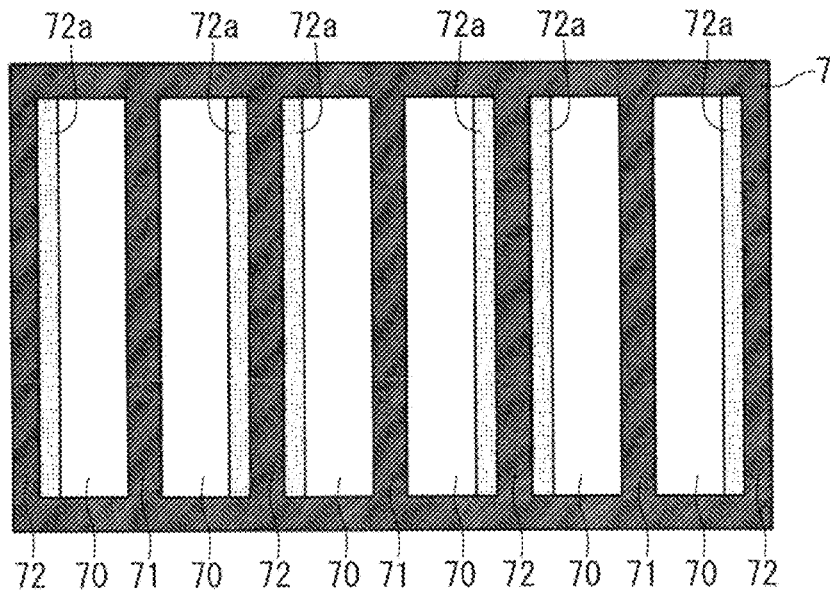
FIG. 8 is a view showing a configuration of a black matrix of the multiple view liquid crystal display according to the first preferred embodiment.

FIG. 7 is a sectional view showing a configuration of a display panel of a multiple view liquid crystal display according to the first preferred embodiment. In FIG. 7, elements having similar functions to those shown in FIG. 4 are provided with the same numerals as those, and hence the descriptions thereof are omitted here. Further, FIG. 8 is a top view of the black matrix 7 provided in the multiple view liquid crystal display of FIG. 7.

With respect to the configuration of FIG. 4, the liquid crystal panel 10 of FIG. 7 is one to be provided with a low refractive-index film 72a, which is a transparent member with a lower refractive index than that of the liquid crystal 5, as a reverse view preventive film at each of the right and left ends of the second light blocking part 72 of the black matrix 7. That is, as shown in FIG. 8, the second light blocking part 72 of the black matrix 7 has the low refractive-index film 72a at each end thereof which is in contact with the pixel opening 70 between the second light blocking part 72 and the adjacent first light blocking part 71.

In the multiple view liquid crystal display of the present preferred embodiment, the gap between the black matrix 7 and the parallax barrier 8 and a position and a diameter of each of the pixel openings 70 in the black matrix 7 and each of the openings 80 in the parallax barrier 8 are designed so as to separate the visual field range IR of the image for right and the visual field range IL of the image for left as in the conventional one. It is to be noted that in the present preferred embodiment, the gap between the black matrix 7 and the parallax barrier 8 is the thickness of the translucent substrate that constitutes the counter substrate 6 corresponding to this gap. Herein, for comparison with the conventional multiple view liquid crystal display described using FIG. 4, the thickness of the translucent substrate is set to the order of 0.08 mm which is within the allowable range in the conventional multiple view liquid crystal display.

Although the low refractive-index film 72a is a transparent member, the refractive index thereof is smaller than the refractive index of the liquid crystal 5, and hence light incident on the low refractive-index film 72a from the liquid crystal 5 side is emitted further outside than before the incidence in accordance with the Snell's law. This suppresses contribution of light having passed through the low refractive-index film 72a to the reverse view phenomenon.

In the multiple view liquid crystal display according to the present preferred embodiment, the visual field range $IR_1$ of the image for right, the visual field range $IR_2$ of the image for right due to the reverse view phenomenon, the visual field range $IL_1$ of the image for left and the visual field range $IL_2$ of the image for left due to the reverse view phenomenon respectively have small widths as compared with those in the conventional example (FIG. 6). Hence in the vicinity of the outer end (vicinity of −60 degrees) of the visual field range $IR_1$ of the image for right and in the vicinity of the outer end (vicinity of 60 degrees) of the visual field range $IL_1$ of the image for left, the widths of the ranges where standardized aperture ratios of both the image for right and the image for left are 0 are larger than those in the conventional example. That is, a margin between the visual field range $IR_1$ of the image for right and the visual field range $IL_2$ of the image for left due to the reverse view phenomenon and a margin between the visual field range $IL_1$ of the image for left and the visual field range $IR_2$ of the image for right due to the reverse view phenomenon are respectively wide.

Therefore, even when a light diffraction phenomenon at the opening in the parallax barrier 8, a light scattering phenomenon inside the liquid crystal panel 10 or the like occurs, it is possible to prevent occurrence of the reverse view crosstalk caused by such a phenomenon. Further, since the visual field range $IR_2$ of the image for right due to the reverse view phenomenon and the visual field range $IL_2$ of the image for left are displaced to the outside, occurrence of the reverse view phenomenon itself can be suppressed.

It is to be noted that as shown in FIG. 8, in the present embodiment, since an effective area of the pixel opening 70 becomes small by an amount of provision of the low refractive-index film 72a at each of the right and left ends of the second light blocking part 72, thereby causing a slight loss in use efficiency of transmitted light. When that become problematical, a ratio of the width of the light blocking part (first and second light blocking parts 71 and 72) to the width of the pixel opening 70 in the black matrix 7 is decreased (namely, an area ratio of the pixel opening 70 in the black matrix 7 is increased), to allow improvement in use efficiency of the transmitted light.

However, when the width of the first light blocking part 71 becomes smaller than the width of the opening 80 in the parallax barrier 8 located immediately above as a result of decreasing the width of the light blocking part 71, even in a substantial observation area regarded as almost an infinity, a front crosstalk occurs, by which the visual field range $IR_1$ of the image for right and the visual field range $IL_1$ of the image for left overlap at the front of the liquid crystal panel 10. For this reason, the width of the first light blocking part 71 of the black matrix 7 is preferably made larger than at least the opening 80 in the parallax barrier 8 immediately above the first light blocking part 71.

Further, similarly to the first light blocking part 71, when the width of the second light blocking part 72 is made larger than that of the opening 80 in the parallax barrier 8, it is possible to prevent a reverse view crosstalk in a substantial observation area which can be regarded as almost an infinity without consideration of the existence of the low refractive-index film 72a.

As thus described, in the multiple view liquid crystal display according to the present preferred embodiment, it is desirable to provide the low refractive-index film 72a at each of the right and left ends of the second light blocking part 72 of the black matrix 7, and adjust the area ratio of the pixel opening 70 in the black matrix 7 in the range where the width of each of the first light blocking part 71 and the second light blocking part 72 is larger than the width of the opening 80 in the parallax barrier 8. Hence it is possible to prevent both the front crosstalk and the reverse view crosstalk, while suppressing the decrease in use efficiency of the transmitted light.

Further, in the multiple view liquid crystal display according to the present preferred embodiment, the thickness of the translucent substrate which corresponds to the gap layer between the black matrix 7 and the parallax barrier 8 has been set to the order of 0.08 mm as a predetermined thickness, which is within the allowable range in the conventional multiple view liquid crystal display on the condition that the image size is 200 μm and the condition for each of the view angle ranges from the front to the right and left is up to 60 degrees. However, it is possible to set the thickness to a larger predetermined thickness while preventing both the front crosstalk and the reverse view crosstalk. That is, even with the pixel size and the condition for the view angle range being the same as those in the conventional example, the predetermined thickness may be set to a thickness to such an extent as to exceed the order of 0.09 mm.

Further, as described above, there is no need for making the gap layer between the parallax barrier 8 and the black matrix 7 as thin as, for example, not larger than the order of 0.09 mm. Therefore, even when the gap layer is configured by the translucent substrate as the base material of the counter substrate 6 as in the present preferred embodiment, there is no need for making the translucent substrate as extremely thin as not larger than the order of 0.09 mm, for example. That is, there is no need for making extremely thin the thickness of the translucent substrate as a principal member that decides the strength and stiffness of the base material of the counter substrate 6, namely the counter substrate 6 itself, and hence the strength and stiffness of the counter substrate 6 itself are relatively high, and hence it is possible to implement the present preferred embodiment with relative ease, while realizing the ease of manufacturing, durability and the like.

Further, in the multiple view liquid crystal display according to the present preferred embodiment, it is possible to obtain the effect of preventing both the front crosstalk and the reverse view crosstalk even in the case of the relatively small pixel pitch, thereby eliminating the need for setting the pixel pitch particularly large, so as to also contribute to improvement in resolution of the multiple view liquid crystal display.

In the present preferred embodiment, the dual view liquid crystal display that displays different images in the two, right and left, directions has been cited as an example. However, the present preferred embodiment may also be applicable, for example, to a multiple view liquid crystal display where pixels that display not less than three different images are two-dimensionally arranged, to display different images in not less than three directions. Further, although the parallax barrier 8 has been one layer in the above description, a plurality of layers may be provided according to the need.

Modified Example

Figure 9:
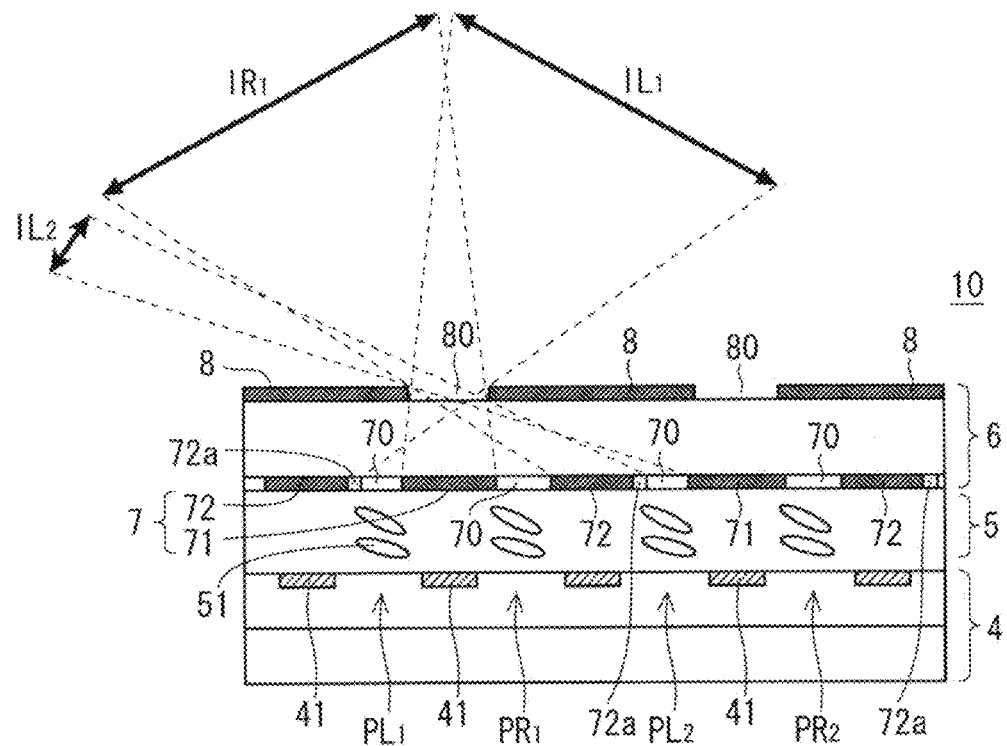
FIG. 9 is a sectional view showing a configuration of a display panel of a multiple view liquid crystal display according to a modified example of the first preferred embodiment.
Figure 10:
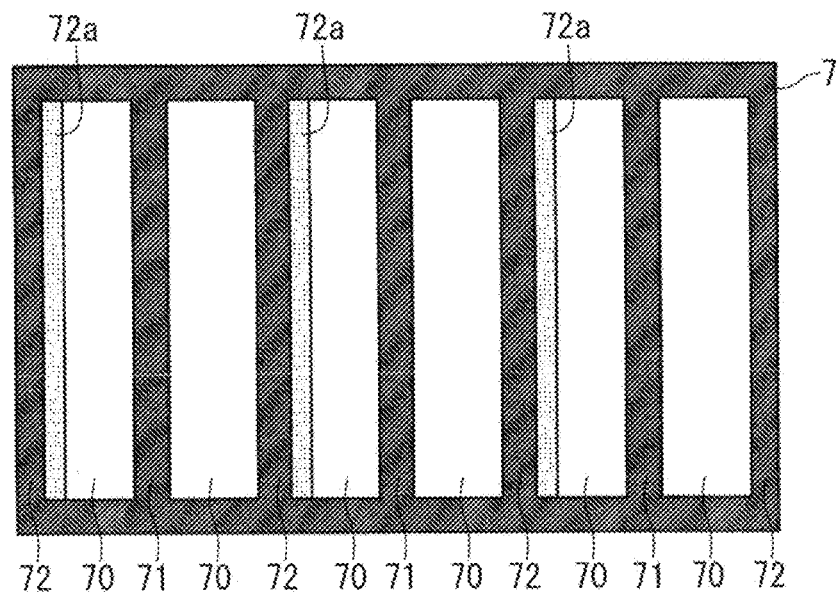
FIG. 10 is a view showing a configuration of a black matrix of the multiple view liquid crystal display according to the modified example of the first preferred embodiment.

Although the low refractive-index film 72a as the reverse view preventive film is provided at each of the right and left ends of the second light blocking part 72 in the first preferred embodiment, it may be provided only at one end thereof as in FIG. 9. That is, the low refractive-index film 72a may be provided only at the end of the second light blocking part 72 which is in contact with the pixel opening 70 between the second light blocking part 72 and the first light blocking part 71 adjacent thereto in a specific direction. In the example of FIG. 9, the low refractive-index film 72a is provided only at the end of the second light blocking part 72 which is on the side of the pixel PL for left and adjacent to the second light blocking part 72. FIG. 10 is a top view of the black matrix 7 of FIG. 9.

In the present modified example, although the width of the visual field range $IR_1$ of the image for right and the width of the visual field range $IR_2$ of the image for right due to the reverse view phenomenon are the same as those in the conventional one (FIG. 6), the width of the visual field range $IL_1$ of the image for left and the width of the visual field range $IL_2$ of the image for left due to the reverse view phenomenon are small as in the first preferred embodiment. Therefore, a margin between the visual field range $IR_1$ of the image for right and the visual field range $IL_2$ of the image for left due to the reverse view phenomenon and a margin between the visual field range $IL_1$ of the image for left and the visual field range $IR_2$ of the image for right due to the reverse view phenomenon are respectively wide, though not as wide as in the first preferred embodiment. It is thus possible to obtain the effect of preventing the reverse view crosstalk.

Second Preferred Embodiment

Figure 11:
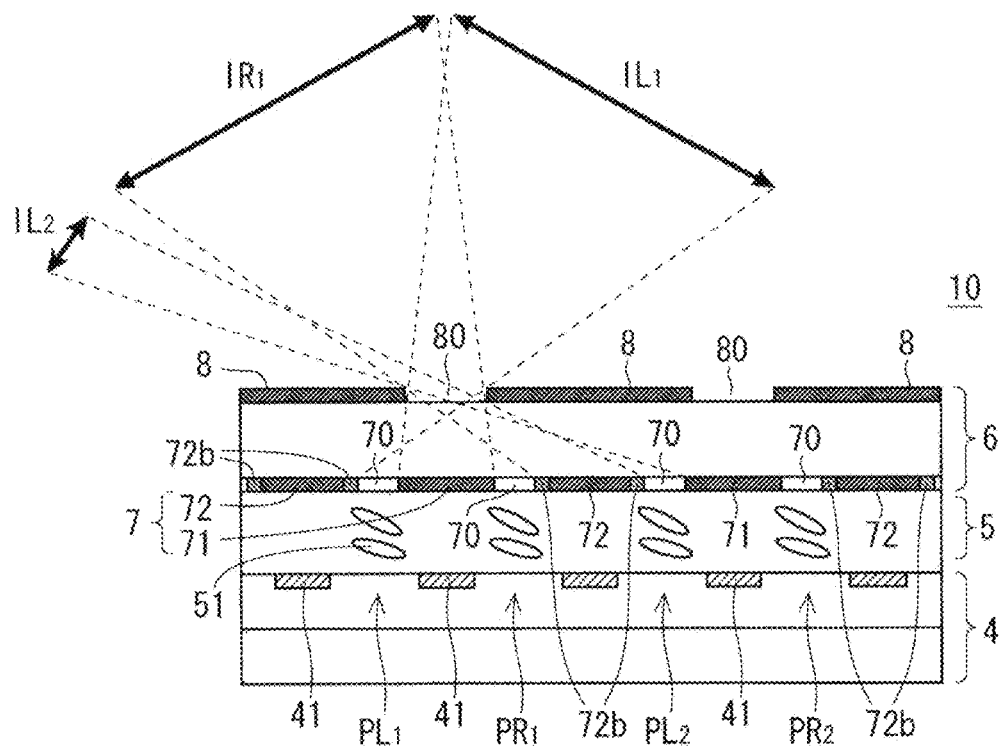
FIG. 11 is a sectional view showing a configuration of a display panel of a multiple view liquid crystal display according to a second preferred embodiment.
Figure 12:
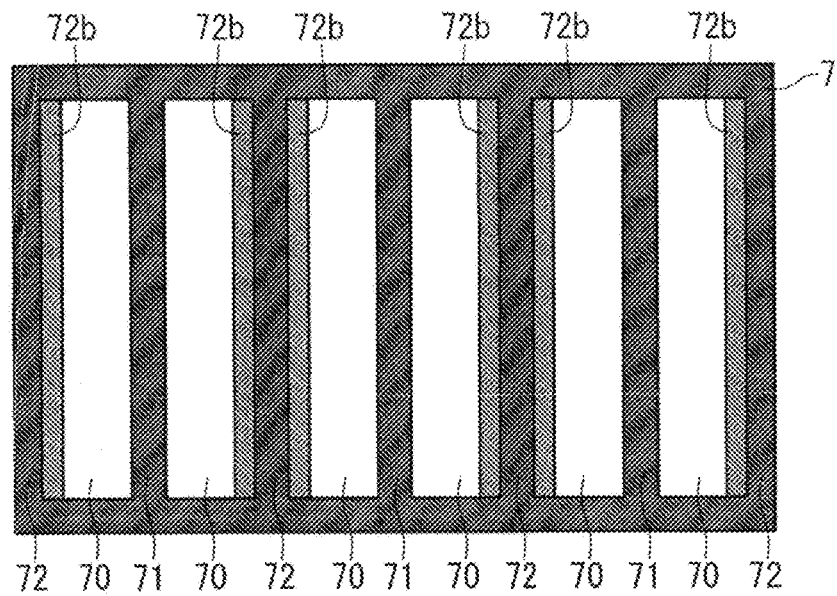
FIG. 12 is a view showing a configuration of a black matrix of the multiple view liquid crystal display according to the second preferred embodiment.

FIG. 11 is a sectional view showing a configuration of a display panel of a multiple view liquid crystal display according to a second preferred embodiment. In the second preferred embodiment, as the reverse view preventive film to be provided at the end of the second light blocking part 72 of the black matrix 7, a low transmittance film 72b with a lower light transmittance than that of the pixel opening 70 is provided in place of the low refractive-index film 72a of the first preferred embodiment. FIG. 12 is a top view of the black matrix 7 of FIG. 11. The other configurations are similar to those in the first preferred embodiment (FIGS. 7 and 8), and hence the descriptions thereof are omitted.

A position provided with the low transmittance film 72b may be the same as the position provided with the low refractive-index film 72a of the first preferred embodiment. That is, the second light blocking part 72 of the present preferred embodiment is configured to have the low transmittance film 72b at each end thereof which is in contact with the pixel opening 70 between the second light blocking part 72 and the adjacent first light blocking part 71.

Since the low transmittance film 72b provided at each of the right and left ends of the second light blocking part 72 weakens light passing through that portion, the width of the visual field range $IR_1$ of the image for right and the width of the visual field range $IR_2$ of the image for right due to the reverse view phenomenon, the width of the visual field range $IL_1$ of the image for left and the width of the visual field range $IL_2$ of the image for left due to the reverse view phenomenon are respectively small, substantially as in the first preferred embodiment. That is, since a margin between the visual field range $IR_1$ of the image for right and the visual field range $IL_2$ of the image for left due to the reverse view phenomenon and a margin between the visual field range $IL_1$ of the image for left and the visual field range $IR_2$ of the image for right due to the reverse view phenomenon are respectively wide, it is possible to obtain a similar effect to that in the first preferred embodiment.

In the present preferred embodiment, the effect of preventing the reverse view crosstalk is obtained to a certain extend so long as the light transmittance of the low transmittance film 72b is lower than the maximal light transmittance of the liquid crystal 5 and there is a significant difference therebetween. When the width of the low transmittance film 72b is constant, the lower the light transmittance of the low transmittance film 72b (the higher the light blocking effect), the higher the above effect, and the effect is maximal when the light transmittance is 0.

Further, when one which transmits light, that is one having a light transmittance other than 0, is used as the low transmittance film 72b, light transmitted through the low transmittance film 72b also functions as original display light in addition to functioning as transmitted light in the visual field range $IR_1$ of the image for right or the visual field range $IL_1$ of the image for left. Hence the width of the low transmittance film 72b, which contributes to prevention of the reverse view crosstalk, can be set to be large while a decrease in transmitted light which contributes to the original display is suppressed.

For example in the case of using the low transmittance film 72b with a light transmittance of 0.5 (50%), as compared with the case of using the low transmittance film 72b with a light transmittance of 0, even when the width of the low transmittance film 72b is made twice, the light transmittance of the original display light as a whole is equivalent. Further, when the width of the low transmittance film 72b is extended to be twice as large, the pixel opening 70 which contributes to the reverse view phenomenon becomes farther from the opening 80 in the parallax barrier 8, leading to expansion of the angle range resistant to viewing of the reverse view phenomenon to the outside, thereby to improve the effect of preventing the reverse view crosstalk. That is, in the case of using the low transmittance film 72b with a light transmittance of 0.5, as compared with the case of using the low transmittance film 72b with a light transmittance of 0 and a width half as large, it is possible to improve the effect of preventing the reverse view crosstalk in accordance with the angle without changing the light transmittance of the original display light as a whole.

Figure 13:
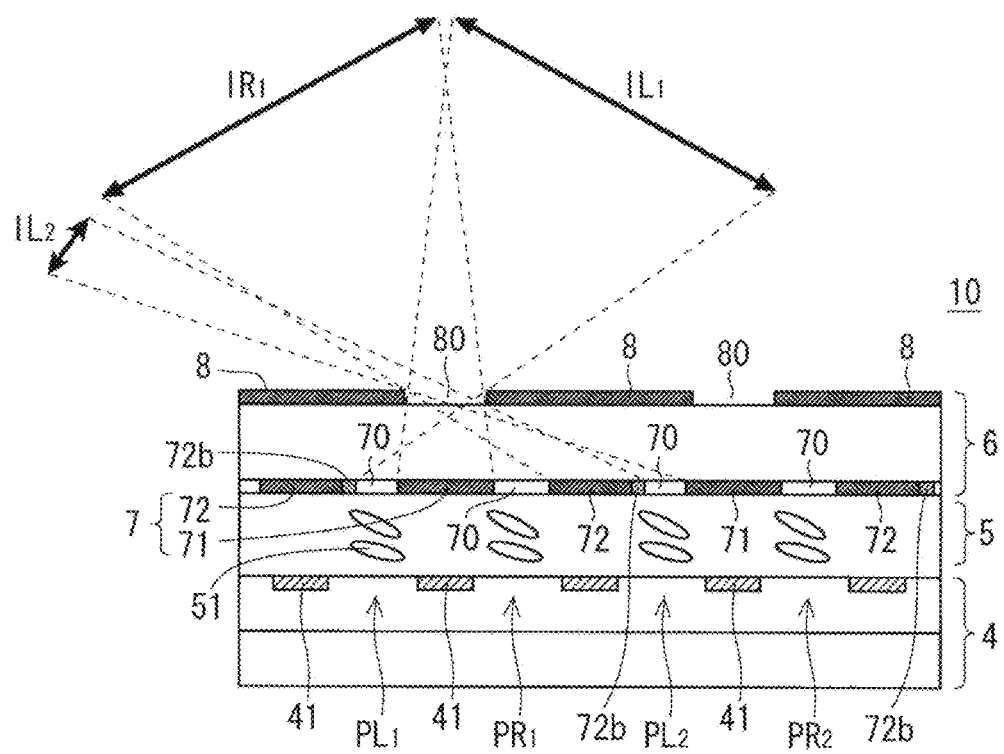
FIG. 13 is a sectional view showing a configuration of a display panel of a multiple view liquid crystal display according to a modified example of the second preferred embodiment.
Figure 14:
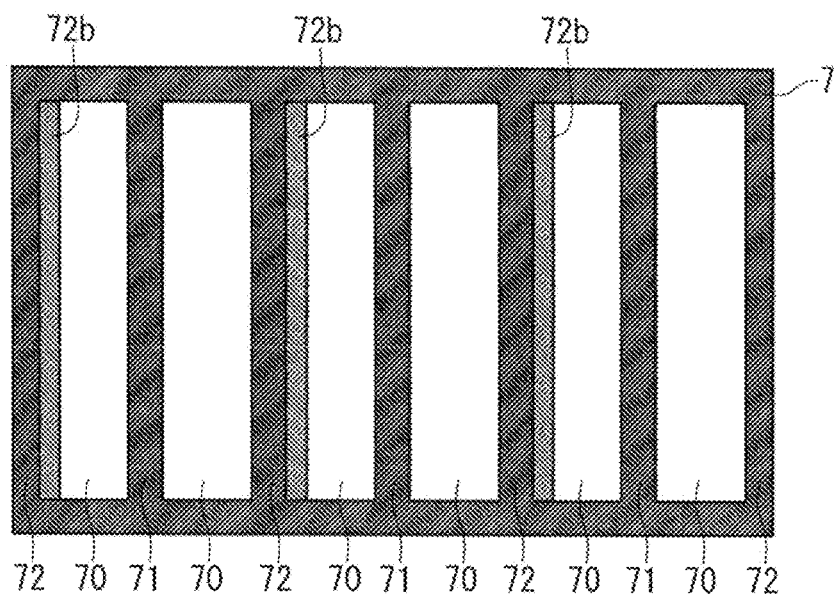
FIG. 14 is a view showing a configuration of a black matrix of the multiple view liquid crystal display according to the modified example of the second preferred embodiment.

As seen from the above description, freely adjusting and designing the light transmittance and the width of the low transmittance film 72b can adjust the brightness characteristics in original display with respect to each angle and the degree of the effect of preventing the reverse view crosstalk. Hence it can be said that the configuration where the low transmittance film 72b transmits light, namely the configuration where the light transmittance is not 0, is an advantageous configuration with a high degree of flexibility Modified Example Although the low transmittance film 72b as the reverse view preventive film is provided at each of the right and left ends of the second light blocking part 72 in the second preferred embodiment, it may be provided only at one end as in FIG. 13. That is, the low transmittance film 72b may be provided only at the end of the second light blocking part 72 which is in contact with the pixel opening 70 between the second light blocking part 72 and the first light blocking part 71 adjacent thereto in a specific direction. In the example of FIG. 13, the low transmittance film 72b is provided only at the end of the second light blocking part 72 which is on the side of the pixel PL for left and adjacent to the second light blocking part 72. FIG. 14 shows a top view of the black matrix 7 of FIG. 13.

In the present modified example, although the width of the visual field range $IR_1$ of the image for right and the width of the visual field range $IR_2$ of the image for right due to the reverse view phenomenon are the same as those in the conventional one (FIG. 6), the width of the visual field range $IL_1$ of the image for left and the width of the visual field range $IL_2$ of the image for left due to the reverse view phenomenon are small as in the second preferred embodiment. Therefore, a margin between the visual field range $IR_1$ of the image for right and the visual field range $IL_2$ of the image for left due to the reverse view phenomenon and a margin between the visual field range $IL_1$ of the image for left and the visual field range $IR_2$ of the image for right due to the reverse view phenomenon are respectively wide, though not as wide as in the second preferred embodiment. It is thus possible to obtain the effect of preventing the reverse view crosstalk.

Third Preferred Embodiment

Figure 15:
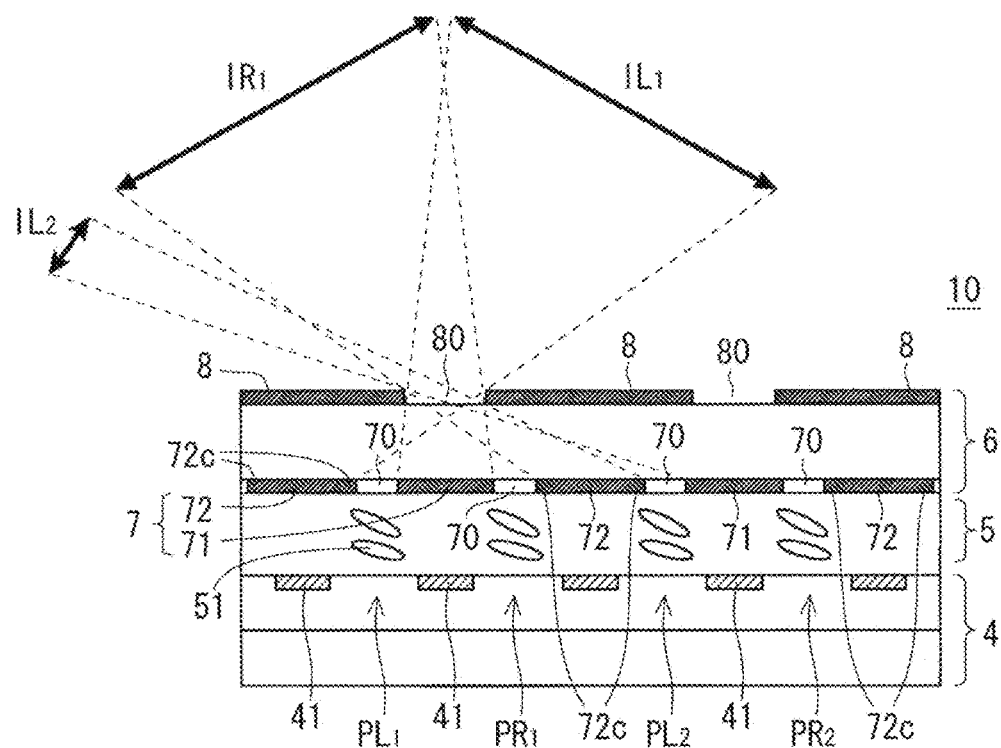
FIG. 15 is a sectional view showing a configuration of a display panel of a multiple view liquid crystal display according to a third preferred embodiment.
Figure 16:
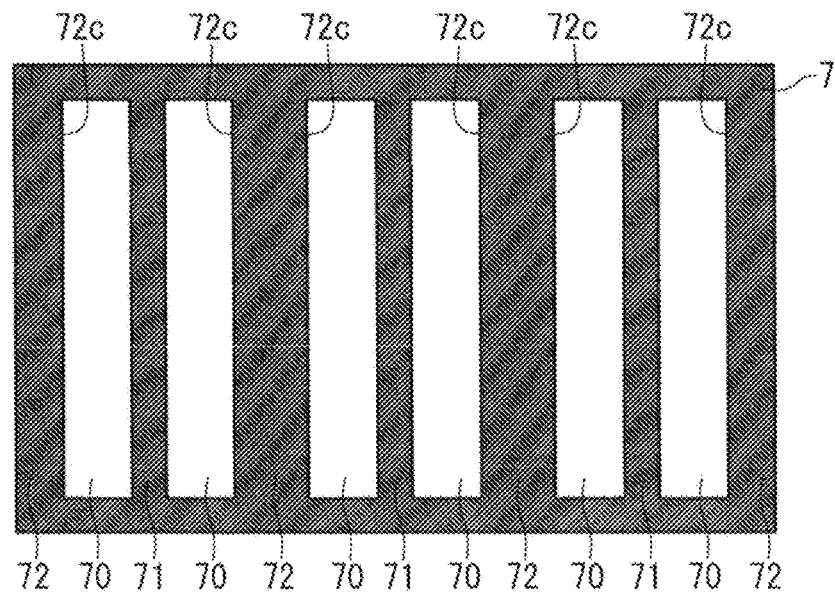
FIG. 16 is a view showing a configuration of a black matrix of the multiple view liquid crystal display according to the third preferred embodiment.

FIG. 15 is a sectional view showing a configuration of a display panel of a multiple view liquid crystal display according to a third preferred embodiment. In the third preferred embodiment, the low transmittance film 72b as the reverse view preventive film of the second preferred embodiment is configured by a light blocking film 72c which is the same material as the light blocking part (first and second light blocking parts 71 and 72) of the black matrix 7. FIG. 16 is a top view of the black matrix 7 of FIG. 15. The other configurations are similar to those in the second preferred embodiment (FIGS. 13 and 14), and hence the descriptions thereof are omitted.

A position provided with the light blocking film 72c may be the same as the position provided with the low transmittance film 72b of the second preferred embodiment. That is, the second light blocking part 72 of the present preferred embodiment is configured to have the second light blocking film 72c at each end thereof which is in contact with the pixel opening 70 between the second light blocking part 72 and the adjacent first light blocking part 71. In the present preferred embodiment, the second light blocking film 72c of the same material as the second light blocking part 72 is provided at each of the right and left of the second light blocking part 72, thereby making the width of the second light blocking part 72 larger than the width of the adjacent first light blocking part 71.

Since a portion as the light blocking film 72c provided at each of the right and left ends of the second light blocking part 72 does not transmit light, the width of the visual field range $IR_1$ of the image for right, the width of the visual field range $IR_2$ of the image for right due to the reverse view phenomenon and the width of the visual field range $IL_1$ of the image for left and the width of the visual field range $IL_2$ of the image for left due to the reverse view phenomenon are respectively small, as in the first preferred embodiment. That is, since a margin between the visual field range $IR_1$ of the image for right and the visual field range $IL_2$ of the image for left due to the reverse view phenomenon and a margin between the visual field range $IL_1$ of the image for left and the visual field range $IR_2$ of the image for right due to the reverse view phenomenon are respectively wide, it is possible to obtain a similar effect to that in the first preferred embodiment.

FIG. 17 is a graph showing a simulation result of view angle characteristics of a standardized aperture ratio in the multiple view liquid crystal display according to the present preferred embodiment. In the simulation, parameters for the thickness of the counter substrate 6, the pixel size and the like in the multiple view liquid crystal display are the same as those in the case of FIG. 6 except that the light blocking film 72c is provided at each side of the second light blocking part 72.

Since the reverse view preventive film (light blocking film 72c) of the present preferred embodiment is made of the same material as the second light blocking part 72 of the black matrix 7, it can be formed in the same process as the second light blocking part 72. That is, only the pattern design of the black matrix 7 may be changed so as to extend the width of the second light blocking part 72, and there is no need for separately performing a forming process for the light blocking film 72c. It can thus be said that this is the most excellent preferred embodiment in viewpoint of design easiness as well as manufacturing cost.

It is to be noted that the reverse view preventive film, made of the same material as the second light blocking part 72 of the black matrix 7 in the present preferred embodiment, may be formed by partial reduction in thickness of the film by means of a known half-tone exposure technique or the like at the time of pattern formation of the second light blocking part 72, so as to have a configuration to transmit light, namely a configuration to have a light transmittance of not 0, whereby it is possible to obtain a similar effect to that of the configuration described in the second preferred embodiment where the low transmittance film 72b transmits light, while holding the advantage of being formable in the same process as that for the second light blocking part 72 described above.

Modified Example

Figure 18:
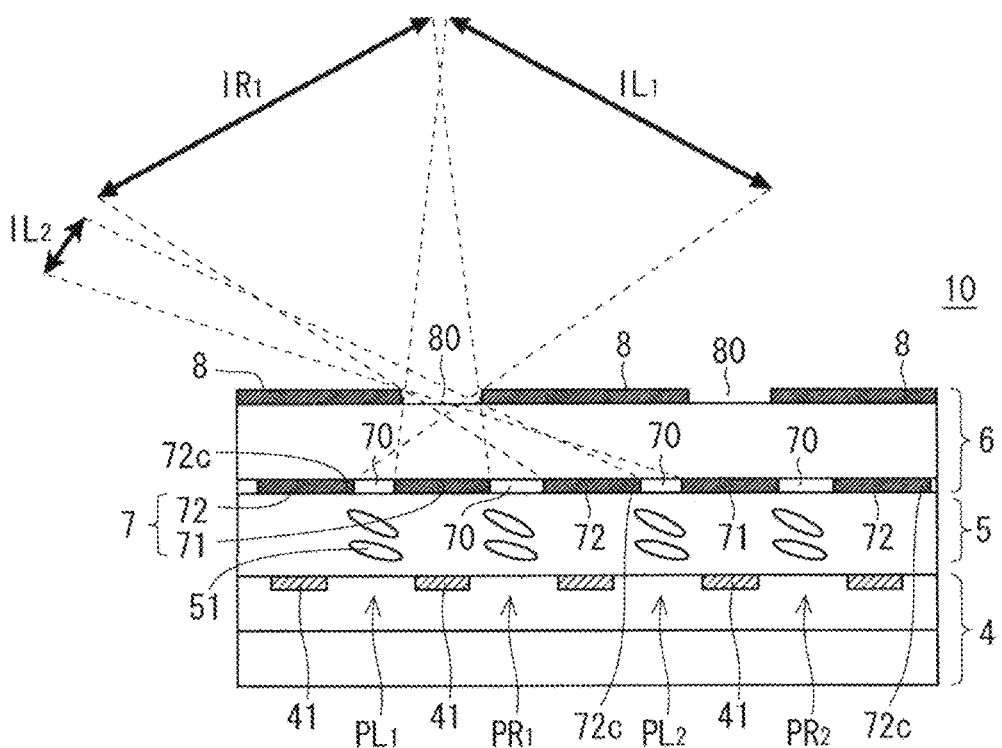
FIG. 18 is a sectional view showing a configuration of a display panel of a multiple view liquid crystal display according to a modified example of the third preferred embodiment.

Although the light blocking film 72c as the reverse view preventive film is provided at each of the right and left ends of the second light blocking part 72 (the width of the light blocking film 72c is extended to both the right and left) in the third preferred embodiment, it may be provided only at one end as in FIG. 18. That is, the width of the second light blocking part 72 may be extended only in a direction toward the first light blocking part 71 which is adjacent to the second light blocking part 72 in a specific direction.

Figure 19:
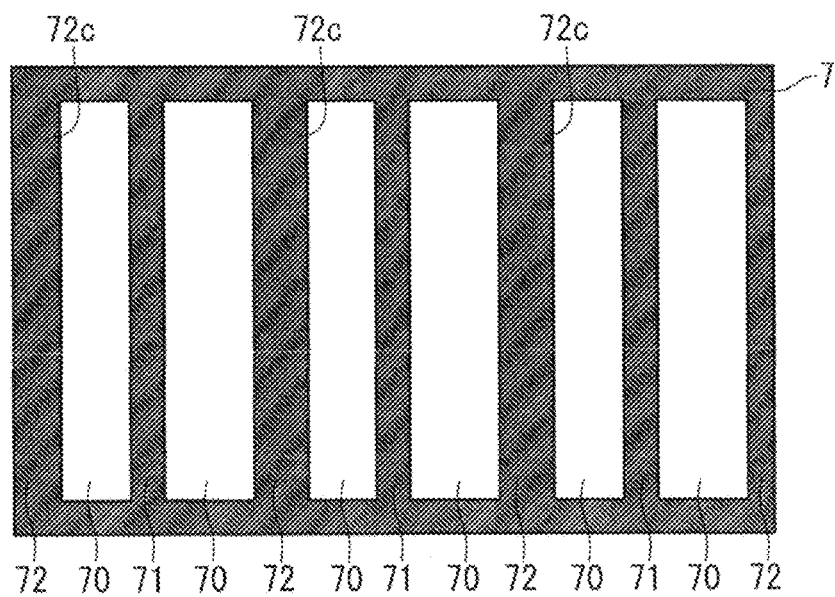
FIG. 19 is a view showing a configuration of a black matrix of the multiple view liquid crystal display according to the modified example of the third preferred embodiment.

In the example of FIG. 18, the width of the second light blocking part 72 is extended only at the end of the second light blocking part 72 which is on the side of the pixel PL for left and adjacent to the second light blocking part 72. As a result, the width of the pixel opening 70 adjacent to the second light blocking part 72 and corresponding to the pixel PL for left (space between the second light blocking part 72 and the first light blocking part 71 adjacent thereto in a specific direction) is smaller than the pixel opening 70 adjacent to the second light blocking part 72 and corresponding to the pixel PR for right (space between the second light blocking part 72 and the first light blocking part 71 adjacent thereto in the other direction). FIG. 19 shows a top view of the black matrix 7 of FIG. 18.

Further, FIG. 20 is a graph showing a simulation result of view angle characteristics of a standardized aperture ratio in the multiple view liquid crystal display according to the present modified example. In the present modified example, although the width of the visual field range $IR_1$ of the image for right and the width of the visual field range $IR_2$ of the image for right due to the reverse view phenomenon are the same as those in the conventional one (FIG. 6), the width of the visual field range $IL_1$ of the image for left and the width of the visual field range $IL_2$ of the image for left due to the reverse view phenomenon are small as in the third preferred embodiment. Therefore, a margin between the visual field range $IR_1$ of the image for right and the visual field range $IL_2$ of the image for left due to the reverse view phenomenon and a margin between the visual field range $IL_1$ of the image for left and the visual field range $IR_2$ of the image for right due to the reverse view phenomenon are respectively wide, though not as wide as in the third preferred embodiment. It is thus possible to obtain the effect of preventing the reverse view crosstalk.

While the invention has been described in detail, the foregoing description is in all aspects illustrative and not restrictive. It is understood that numerous other modifications and variations can be devised without departing from the scope of the invention.

What is claimed is:

1. A multiple view liquid crystal display, comprising:
   a first substrate disposed with a plurality of pixel electrodes to be supplied with image signals corresponding to a plurality of images;
   a second substrate arranged as opposed to said first substrate; and
   a liquid crystal sandwiched between said first substrate and said second substrate, wherein
   said second substrate is provided with
   a black matrix as a light blocking film disposed on the opposed surface to said first substrate and having an opening that defines an area of each pixel,
   a gap layer which has a predetermined thickness and is arranged on said black matrix, and
   a parallax barrier as a light blocking film which is disposed on said black matrix with said gap layer interposed therebetween and separates light having passed through the openings in said black matrix into different directions, so as to separate said plurality of images and display said images in said respective different directions,
   said black matrix is provided with
   a first light blocking part disposed immediately below the opening in said parallax barrier, and
   a second light blocking part with a portion immediate thereabove covered by said parallax barrier, and
   said second light blocking part has at the end thereof a reverse-view preventive film with a lower refractive index than that of said liquid crystal, the end being in contact with the opening between said second light blocking part and said adjacent first light blocking part.

2. The multiple view liquid crystal display according to claim 1, wherein said reverse view preventive film of said second light blocking part is provided only at the end of said second light blocking part which is in contact with the opening between said second light blocking part and said first light blocking part adjacent thereto in a specific direction.

3. The multiple view liquid crystal display according to claim 1, wherein a width of said second light blocking part is larger than a width of the opening in said parallax barrier.

4. The multiple view liquid crystal display according to claim 1, wherein said gap layer is a translucent substrate as a base material of said second substrate.

5. A multiple view liquid crystal display, comprising:
   a first substrate disposed with a plurality of pixel electrodes to be supplied with image signals corresponding to a plurality of images;
   a second substrate arranged as opposed to said first substrate; and
   a liquid crystal sandwiched between said first substrate and said second substrate, wherein
   said second substrate is provided with
   a black matrix as a light blocking film disposed on the opposed surface to said first substrate and having an opening that defines an area of each pixel,
   a gap layer which has a predetermined thickness and is arranged on said black matrix, and
   a parallax barrier as a light blocking film which is disposed on said black matrix with said gap layer interposed therebetween and separates light having passed through the openings in said black matrix into different directions, so as to separate said plurality of images and display said images in said respective different directions,
   said black matrix is provided with
   a first light blocking part disposed immediately below the opening in said parallax barrier, and
   a second light blocking part with a portion immediate thereabove covered by said parallax barrier, and
   said second light blocking part has at the end thereof a reverse-view preventive film having a lower light transmittance than that of said opening, the end being in contact with the opening between said second light blocking part and said adjacent first light blocking part.

6. The multiple view liquid crystal display according to claim 5, wherein said reverse view preventive film of said second light blocking part is provided only at the end of said second light blocking part which is in contact with the opening between said second light blocking part and said first light blocking part adjacent thereto in a specific direction.

7. The multiple view liquid crystal display according to claim 5, wherein a width of said second light blocking part is larger than a width of the opening in said parallax barrier.

8. The multiple view liquid crystal display according to claim 5, wherein said gap layer is a translucent substrate as a base material of said second substrate.

9. A multiple view liquid crystal display, comprising:
   a first substrate disposed with a plurality of pixel electrodes to be supplied with image signals corresponding to a plurality of images;
   a second substrate arranged as opposed to said first substrate; and
   a liquid crystal sandwiched between said first substrate and said second substrate, wherein
   said second substrate is provided with
   a black matrix as a light blocking film disposed on the opposed surface to said first substrate and having an opening that defines an area of each pixel,
   a gap layer which has a predetermined thickness and is arranged on said black matrix, and
   a parallax barrier as a light blocking film which is disposed on said black matrix with said gap layer interposed therebetween and separates light having passed through the openings in said black matrix into different directions, so as to separate said plurality of images and display said images in said respective different directions,
   said black matrix is provided with
   a first light blocking part disposed immediately below the opening in said parallax barrier, and
   a second light blocking part with a portion immediate thereabove covered by said parallax barrier, and
   said second light blocking part has a larger width than that of said adjacent first light blocking part.

10. The multiple view liquid crystal display according to claim 9, wherein a space between said second light blocking part and said first light blocking part adjacent thereto in a specific direction is smaller than a space between said second light blocking part and said first light blocking part adjacent thereto in the other direction.

11. The multiple view liquid crystal display according to claim 9, wherein a width of said second light blocking part is larger than a width of the opening in said parallax barrier.

12. The multiple view liquid crystal display according to claim 9, wherein said gap layer is a translucent substrate as a base material of said second substrate.

\* \* \* \* \*